United States Patent
Jan et al.

(10) Patent No.: US 9,482,881 B1
(45) Date of Patent: Nov. 1, 2016

(54) POLYMERIZABLE COMPOSITION FOR COLORING CONTACT LENSES

(71) Applicants: BenQ Materials Corporation, Taoyuan (TW); VISCO VISION INC., Hsinchu County (TW)

(72) Inventors: Fan-Dan Jan, Taoyuan (TW); Tsung-Jung Cheng, Taoyuan (TW)

(73) Assignees: BenQ Materials Corporation, Taoyuan (TW); VISCO VISION INC., Hsinchu (TW)

( * ) Notice: Subject to any disclaimer, the term of this patent is extended or adjusted under 35 U.S.C. 154(b) by 0 days.

(21) Appl. No.: 14/918,561

(22) Filed: Oct. 20, 2015

(30) Foreign Application Priority Data

May 4, 2015 (TW) .............................. 104114162 A

(51) Int. Cl.

| | |
|---|---|
| *C08J 3/28* | (2006.01) |
| *C08F 2/46* | (2006.01) |
| *C08G 61/04* | (2006.01) |
| *G02C 7/10* | (2006.01) |
| *C08K 3/22* | (2006.01) |
| *G02C 7/04* | (2006.01) |
| *G02B 1/04* | (2006.01) |

(52) U.S. Cl.
CPC ................ *G02C 7/108* (2013.01); *C08K 3/22* (2013.01); *G02B 1/043* (2013.01); *G02C 7/04* (2013.01); *C08K 2003/2265* (2013.01)

(58) Field of Classification Search
CPC .......... G02C 7/108; G02C 7/04; C08K 3/22; C08K 2003/2265; G02B 7/04
USPC ................. 522/123, 120, 114, 113, 1; 520/1
See application file for complete search history.

(56) References Cited

U.S. PATENT DOCUMENTS

| 7,048,375 B2 * | 5/2006 | Doshi .............. B29D 11/00317 351/159.25 |
| 2010/0035067 A1 * | 2/2010 | Colton ..................... C08K 3/22 428/425.5 |
| 2011/0001190 A1 * | 1/2011 | Ide ....................... C08G 77/388 257/347 |

FOREIGN PATENT DOCUMENTS

| TW | I459071 B | 11/2014 |
| TW | 201502172 A | 1/2015 |

* cited by examiner

*Primary Examiner* — Ling Choi
*Assistant Examiner* — Jessica E Whiteley
(74) *Attorney, Agent, or Firm* — CKC & Partners Co., Ltd.

(57) ABSTRACT

The disclosure is related to a polymerizable composition for coloring contact lens, comprising a composite colorant and at least one hydrophilic monomer. The composite colorant is produced by a reaction of a colorant precursor and a (methyl)methacryloxy group-containing silane coupling agent. The colorant precursor is produced by a reaction of a metal oxide and a siloxane compound under alkaline solution.

10 Claims, No Drawings

POLYMERIZABLE COMPOSITION FOR COLORING CONTACT LENSES

CROSS-REFERENCE TO RELATED APPLICATION

This application claims the priority benefit of Taiwanese application serial no. 104114162, filed on May 4, 2015, which is incorporated herein by reference.

BACKGROUND

1. Technical Field

The present disclosure relates to a polymerizable composition for coloring contact lenses. More particularly, the polymeriazble composition for coloring contact lenses has good adhesion to the contact lenses so that no discoloration or fading occurred on the colored contact lenses made from hydrogel or silicone hydrogel.

2. Description of Related Art

Nowadays, concerning fashion or clothes matching, people begin to wear colored contact lenses capable of altering their natural iris color. However these different colored or patterned contact lenses would fade or discolor so as to make the wearers have ocular allergy.

One of the conventional methods for manufacturing colored contact lens is to mix a colorant and the hydrophilic monomers to form a mixture, and then a colored layer is formed by printing or transferring the mixture on a surface of the contact lens. However, the method is unfavorable because the colored layer lacks the interaction force with the contact lens, so that the colored layer is easily peeling from contact lenses and discoloration or fading occurs.

Another one of the conventional methods for manufacturing colored contact lenses is first to form a colored layer on the contact lens surface, and than a transparent layer is covered on the colored layer to protect the colored layer from being damaged and discolored. But, this method is so complicated and costly.

Therefore, a novel polymerizable composition for coloring contact lenses is highly demanded. The polymeriazble composition of the present disclosure provides good adhesion to contact lenses to avoid discoloration or fading on the colored contact lenses. In addition, the manufacturing method for coloring contact lenses of the present disclosure is simpler than the conventional manufacturing methods.

SUMMARY

According to aforementioned reasons, it is an object of the present disclosure to provide a novel polymerizable composition for coloring contact lenses, comprising a composite colorant and at least one hydrophilic monomer. The composite colorant is produced by a reaction of a colorant precursor and a (methyl)methacryloxy group-containing silane coupling agent. The colorant precursor is produced by a reaction of a metal oxide a siloxane compound under alkaline solution.

In an embodiment of the present disclosure, the (methyl) methacryloxy group-containing silane coupling agent for manufacturing the composite colorant is selected from the group consisting of 3-(meth)acryloxypropyltrimethoxysilane, 3-(meth)acryloxypropyltriethoxysilane, 3-(meth)acryloxypropylmethyldiethoxysilane and 3-(meth)acryloxypropylmethyl-dimethoxysilane and a combination thereof.

In an embodiment of the present disclosure, the metal oxide for manufacturing the colorant precursor applied for coloring contact lenses is known in the art, for example, such as inorganic colorant and/or inorganic pigment. The inorganic colorant and/or inorganic can be, but not limited to, Iron Oxide Black, Iron Oxide Blown, Iron Oxide Yellow, Iron Oxide Red or Titanium Dioxide.

In an embodiment of the present disclosure, the siloxane compound for manufacturing the colorant precursor is tetraethoxy silane or tetramethoxy silane.

In an embodiment of the present disclosure, the hydrophilic monomer is selected from the group consisting of N-vinylpyrrolidone (NVP), 2-hydroxyethyl methacrylate (HEMA), N,N-dimethylacrylamide (DMA), methyl acrylic acid, acrylic acid, glycidyl methacrylate (GMA), (methyl) acrylamide, 2-(N,N-dimethylamino) ethyl methacrylate (DMAEMA), vinyl acetate, 2-(dimethylamino)ethyl methacrylate, N-acrylolmorpholine and a combination thereof.

In an embodiment of the present disclosure, the polymerizable composition for coloring contact lenses further includes a thickener which is selected from the group consisting of polyurethane, acrylic resin, phenolic resin, polyvinylpyrrodine and a combination thereof.

In an embodiment of the present disclosure, the polymerizable composition for coloring contact lenses further includes a crosslinking agent.

In an embodiment of the present disclosure, the polymerizable composition for coloring contact lenses further includes a dispersant.

In an embodiment of the present disclosure, the polymerizable composition for coloring contact lenses further includes a photo initiator or a thermal initiator.

In an embodiment of the present disclosure, the composite colorant is present at an amount of 10 weight percent to 60 weight percent based on the total amount of the polymerizable composition.

In an embodiment of the present disclosure, the polymerizable composition is used for coloring contact lenses made from silicone gel or hydrogel.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

According to an aspect of the present disclosure, the present disclosure provides a novel polymerizable composition for coloring contact lenses, comprising a composite colorant and at least one hydrophilic monomer. The composite colorant is produced by a reaction of a colorant precursor and a (methyl)methacryloxy group-containing silane coupling agent, wherein the colorant precursor is produced by a reaction of a metal oxide and a siloxane compound under alkaline condition.

In an embodiment of the present disclosure, the hydrophilic monomers for manufacturing the polymeriazble composition can be, but not limited to, N-vinylpyrrolidone (NVP), 2-hydroxyethyl methacrylate (HEMA), N,N-dimethylacrylamide (DMA), methyl acrylic acid (MAA), acrylic acid, glycidyl methacrylate (GMA), (methyl)acrylamide, 2-(N,N-dimethylamino) ethyl methacrylate (DMAEMA), vinyl acetate, 2-(Dimethylamino)ethyl methacrylate, N-acrylolmorpholine and a combination thereof.

Moreover, for enhancing the compatibility between the polymerizable composition and the contact lenses, the hydrophilic monomers is present at an amount of 10 weight percent to 30 weight percent based on the total weight of the polymerizable composition.

In an embodiment of the present disclosure, concerning the performance and optical transmittance of the colored contact lenses, the composite colorant is present at an amount of 10 weight percent to 60 weight percent based on the total weight of the polymerizable composition.

According to the present disclosure, the composite colorant is produced by a reaction of a colorant precursor and a (methyl)methacryloxy group-containing silane coupling agent.

In an embodiment of the present disclosure, the (methyl) methacryloxy group-containing silane coupling agent for manufacturing the composite colorant is selected from the group consisting of 3-(meth)acryloxypropyltrimethoxysilane, 3-(meth)acryloxypropyltriethoxysilane, 3-(meth)acryloxypropylmethyldiethoxysilane and 3-(meth)acryloxypropylmethyl-dimethoxysilane and a combination thereof.

In addition, in an embodiment of the present disclosure, the reaction condition for the colorant precursor reacted with the (methyl)methacryloxy group-containing silane coupling agent is at 30° C. to 70° C. for 2 hours to 24 hours.

According to the present disclosure, the colorant precursor is produced by a reaction of a metal oxide and a siloxane compound under alkaline solution.

In an embodiment of the present disclosure, the metal oxide for manufacturing the colorant precursor applied for coloring contact lenses is known in the art, for example, such as inorganic colorant and/or inorganic pigment. The inorganic colorant and/or inorganic can be, but not limited to, Iron Oxide Black, Iron Oxide Blown, Iron Oxide Yellow, Iron Oxide Red or Titanium Dioxide.

In an embodiment of the present disclosure, the siloxane compound for manufacturing the colorant precursor is tetraethoxy silane or tetramethoxy silane.

In an embodiment of the present disclosure, the pH value of alkaline solution is in the range of 8 to 10. The solvent in the alkaline solution is selected from the group consisting of water, methanol, ethanol and a combination thereof.

In an embodiment of the present disclosure, the polymerizable composition further includes a thickener which is selected from the group consisting of polyurethane, acrylic resin, phenolic resin, polyvinylpyrrodine and a combination thereof.

For obtaining the appreciate viscosity of the polymerizable composition, the thickener is present at an amount of 20 weight percent to 40 weight percent based on the total weight of the polymerizable composition.

In an embodiment of the present disclosure, the thickener is the combination of the polyurethane and poly(N-vinylpyrrolidone), wherein the viscosity of the polyurethane at 25° C. is in the range of 50,000 cps to 150,000 cps, preferably in the range of 80,000 cps to 110,000 cps and the poly(N-vinylpyrrolidone) is such as PVP-k series, which can be but not limited to, PVP-k15, PVP-k16, PVP-k17, PVP-k18, VPV-k29, PVP-k30, PVP-k32 or PVP-k90.

In an embodiment of the present disclosure, the polymerizable composition further includes a cross-linking agent. The cross-linking agent is such as, for example ethylene glycol dimethacrylate (EGDMA), tetraethylene ethylene glycol dimethacrylate (TrEGDMA), triethylene ethylene glycol dimethacrylate (TEGDMA), Poly(ethylene glycol) dimethacrylate, trimethylolpropane trimethacrylate (TMPTA), vinyl methacrylate, ethylenediamine dimethyl acrylamide, glycerol dimethacrylate, triallyisocyanurate or triallyl cyanurate or the combination thereof. Further, the crosslinking agent is present at an amount of 1 to 3 weight percent based on the total weight of the polymerizable composition.

In an embodiment of the present disclosure, the polymerizable composition further includes a dispersant. The dispersant is selected from the group consisting of phosphoester, acrylic ester monomer and acrylic resin. Further, the dispersant is present at the amount of 2 weight percent to 10 weight percent based on the total weight of the polymerizable composition.

In an embodiment of the present disclosure, the polymerizable composition further includes a photo initiator or a thermal initiator. The suitable thermal initiator, can be not limited to, such as, for example, azobisisoheptonitrile, 2,2'-azobis(isobutyronitrile) (AIBN), 2,2'-azobis(2,4-dimethyl-valeronitrile), 2,2'-azobis(2-methyl-propanenitrile), 2,2'-azobis(2-methyl-butanenitrile). The suitable photoinitiator, can be not limited to, such as, for example, 2,4,6-trimethylbenzoyl diphenyl oxide, 2-Hydroxy-2-methylpropiophenone, 2,2-Diethoxyacetophenone or ethyl(2,4,6-trimethylbenzoyl)phenylphosphinate. The photo initiator or a thermal initiator is present at the amount of 2 weight percent to 5 weight percent based on the total amount of the polymerizable composition.

According to different types of the colored contact lenses, the composite colorant is present at the amount of 0.1 weight percent to 0.5 weight percent based on the total amount of the polymerizable composition.

The present disclosure will be explained in further detail with reference to the examples. However, the present disclosure is not limited to these examples.

Example A

The Preparation Method of Composite Colorant (I)

100 g of Iron Oxide Black powder (trade name is Sicovit and is available from BASF, Germany), 150 ml of deionized water, 150 ml of ethanol, 22 ml of aqueous solution of ammonium (the weight percent concentration is 25%) and 5 ml of tetraethoxysilane (available from Acros Organics, US) were mixed uniformly in a flask to form a mixture. Next, the mixture was heated to 65° C. for 2 hours, after that, 8 ml of 3-methacryloxypropyltrimethoxysilane (trade name is KBM503 and is available from Shin-Etsu Silicone, Japan) was added into the flask and reacted for another 6 hours. Then, the supernatant of the resulting reaction solution was removed by using of centrifugation, after that, the remaining solution was washed with ethanol and deionized water. After the solvent was removed, the composite colorant (I) was obtained.

Example B

The Preparation Method of Composite Colorant (II)

The preparation method of Example B was the same as Example A, except that the amount of silane coupling agent. The silane coupling used in Example B was 4 ml.

Example C

The Preparation Method of Composite Colorant (III)

The preparation method of Example C was the same as Example A, except that the amount of silane coupling agent. The silane coupling agent used in Example C was 2 ml.

Example D

The Preparation Method of Composite Colorant (IV)

The preparation method of Example D was the same as Example A, except that the amount of silane coupling agent. The silane coupling agent used in Example C was 1 ml.

The preparation method of colored contact lenses

Example 1

First, the composite colorant (I), 2-hydroxyethyl methacrylate (HEMA), methacrylic acid (MAA), polyurethane (trade name is AgiSyn 230SM-Z90, and is available from Dsm-AGI Corp., Taiwan), polyvinylpyrrodine (trade name is PVP-k30, the weight average molecular weight is 40,000 and is available from Sigma-Aldrich, US), Disponer 910 (available from Elementis Specialties, UK) and a photoinitiator, 2-Hydroxy-2-methylpropiophenone (trade name is Darocur 1173 and is available from Basf, Taiwan) were grinded into a ball mill (RETSCHPM 400) to form a polymerizable composition with a viscosity between 9,000 to 10,000 cps and the average particle size thereof is 1 um. The detailed composition of polymerizable composition of Example 1 was listed in Table 1 as below.

Then, the polymerizable composition was injected into a mold of a contact lens made of polypropylene (PP) and conducted a UV irradiating treatment or a thermal irradiating treatment to form a coloring layer thereon.

After the polymerization was completed, a siloxane macromer (I) (disclosed in TW. Patent No. I459071, synthesis of siloxane macromer A), a siloxane macromer (II) (disclosed in TW. Patent No. I459071, synthesis of siloxane macromer B), 2-hydroxyethyl methacrylate (HEMA), N-vinylpyrrodine (NVP), cross-linking agent, photo initiator, 2-hydroxy-2-methylpropiophenone (trade name is Darocur 1173 and is available from Basf, Taiwan) were mixed at amounts shown in Table 1 to form a contact lens material. Then, the contact lens material was added by drops on the coloring layer formed on the mold of the contact lens and was cured at 80° C. for 5 hrs, than 135° C. for 2 hrs. After the polymerization was completed, the mold was immersed in alcohol for 1 hour and the resulting molded lens was taken out of the mold. In Final, the resulting lens was conducted a hydration treatment to obtain the colored contact lens. The detailed composition of contact lenses material of Example 1 is in Table 2.

The preparation method of Example 2 was the same as Example 1, except the composite colorant. The composite colorant (II) was used in Example 2. The detailed composition of Example 2 was listed in Table 1 and Table 2.

Example 3

The preparation method of Example 3 was the same as Example 1, except the type of composite colorant. The composite colorant (III) was used in the Example 3. The detailed composition of Example 3 was listed in Table 1 and Table 2.

Example 4

The preparation method of Example 4 was the same as Example 1, except the composite colorant. The composite colorant (IV) was used in Example 4. The detailed composition of Example 4 was listed in Table 1 and Table 2.

Comparative Example 1

The preparation method of Comparative Example 1 was the same as Example 1, except the composite colorant. The Iron Oxide Black powder (trade name is Sicovi and is available from BASF, Taiwan) was used in Comparative Example 1. The detailed composition of Comparative Example 1 was listed in Table 1 and Table 2.

The physical properties of the colored contact lenses prepared from Example 1 to Example 4 and Comparative 1 were measured according to the following measuring method. The resulting data were listed in the Table 3.

(a) Measurement of the Water Content of Contact Lenses

The contact lens was immersed in the phosphate buffered saline (PBS) for 24 hours. Then, the contact lens was removed therefrom and was taken to remove all surface water. After that, the weight of contact lens was measured. Next, the contact lens was hydrated at 600 W for 5 minutes by microwave and after that the weight of hydrated contact lens was measured. The water contact of contact lenses was calculated by the following equation:

(The weight of hydrated contact lenses–The weight of dry contact lenses)/The weight of hydrated contact lenses×100%.

(b) Measurement of Tensile Modulus and Tensile Strength of Contact Lenses

The test sample was cut from the middle area of a contact lens into a sample size of 10 mm. Then, the test sample was immersed in a buffer specified in ISO 18369-3 Section 4.7 for 2 hours. After that, the test sample was taken to remove all surface water and be conducted to proceed tensile modulus and tensile strength measurement by using an AI-3000 (available from Gotech Testing Maching Inc.) in a condition of temperature between 20±5° C. and a humidity between 55%±10%. The measurement was carried out at a constant loading speed of 10 mm/min. In final, the tensile modulus and tensile strength were determined according to the initial gradient of the strain-stress curve. The unit of the tensile modulus is defined as MPa and the unit of tensile strength is defined as gram.

(c) Measurement of Oxygen Permeability of Contact Lenses

The oxygen permeability (Dk) was measured according to ISO standards 18369-4:2006, 4.4.3, by using a oxygen permeability tester (201T). The units of oxygen permeability (Dk) is defined as $10^{-10}$ $(mlO_2$ mm$)(cm^2$ sec mm Hg).

(d) Evaluation of Deformation of Contact Lenses

The appearance of the contact lens was observed by visual to judge if the deformation occurred or not.

(d) Evaluation of Discolor of Contact Lenses

The contact lens was put on a stage and a cotton swab was used to rub the surface of the contact lens for 40 times. In final, the surface of the cotton swab was observed by visual to judge if any color fading from the contact lenses.

It can be seen from Table 3 that, comparing with Comparative Example 1, the adhesion of the colored contact lens preparing according to Example 1 to Example 4 are so good that no discoloration occurred. Furthermore, the colored contact lens thereof also has no deformation occurrence.

In addition, the water content of the contact lenses prepared according to Example 1 to Example 4 is 46% to 48%, the tensile modulus thereof is about 0.57 MPa to 0.63 MPa and the tensile strength thereof is about 45 g to 51 g. Besides, the oxygen permeability thereof is about 100 to 120.

While the disclosure has been described by way of example(s) and in terms of the embodiments, it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

TABLE 1

The detailed composition of the polymerizable composition of Example 1 to Example 4 and Comparative Example 1

|  |  | Example (wt %) | | | | Comparative Example (wt %) |
| --- | --- | --- | --- | --- | --- | --- |
| | Composition | 1 | 2 | 3 | 4 | 1 |
| Colorant | Composite colorant | 50 | 50 | 50 | 50 | 50 |
| Hydrophilic monomer | 2-HEAM | 12.8 | 12.8 | 12.8 | 12.8 | 12.8 |
|  | MAA | 3.4 | 3.4 | 3.4 | 3.4 | 3.4 |
| Base resin | Polyurethane | 15 | 15 | 15 | 15 | 15 |
| Thickener | PVP | 11.5 | 11.5 | 11.5 | 11.5 | 11.5 |
| Dispersant | Disponer910 | 2.5 | 2.5 | 2.5 | 2.5 | 2.5 |
| Crosslinking agent | TMPTA | 1.8 | 1.8 | 1.8 | 1.8 | 1.8 |
| Initiator | UV-1173 | 3.0 | 3.0 | 3.0 | 3.0 | 3,0 |

TABLE 2

The detailed composition of contact lenses of Example 1 to Example 4 and Comparative Example 1

|  |  | Example (wt %) | | | | Comparative Example (wt %) |
| --- | --- | --- | --- | --- | --- | --- |
| | Composition | 1 | 2 | 3 | 4 | 1 |
| Siloxane macromer | Siloxane macromer(I) | 41.8 | 41.8 | 38.6 | 20.9 | 38.6 |
|  | Siloxane macromer(II) | 6.3 | 6.3 | 5.8 | 20.9 | 5.8 |
| Hydrophilic monomer | NVP | 44.9 | 43.9 | 41.5 | 51.2 | 41.5 |
|  | 2-HEMA | 6.3 | 6.3 | 13.5 | 6.3 | 13.5 |
| Cross-linking agent | EGDMA | 0 | 1 | 0 | 0 | 0 |
| Initiator | AIBN | 0.7 | 0.7 | 0.7 | 0.7 | 0.7 |
| Solvent | Hexane | 25.1 | 25.1 | 9.7 | 25.1 | 25.1 |

TABLE 3

The measurement results of Example 1 to Example 4 and Comparative Example 1

| | Example | | | | Comparative Example |
| --- | --- | --- | --- | --- | --- |
| Test item | 1 | 2 | 3 | 4 | 1 |
| Water content (%) | 46.5 | 46.4 | 47.2 | 46.9 | 46.4 |
| Tensile modulus (MPa) | 0.63 | 0.60 | 0.57 | 0.58 | 0.61 |
| Tensile Strength (g) | 46 | 49 | 51 | 45 | 41 |
| Oxygen permeability (Dk) | 104 | 107 | 120 | 114 | 111 |
| Thickness (um) | 0.077 | 0.069 | 0.075 | 0.071 | 0.070 |
| Deformation | No | No | No | No | No |
| Discoloration | No | No | No | No | Yes |

What is claimed is:

1. A polymerizable composition for coloring contact lenses, comprising:
    a composite colorant produced by a reaction of a colorant precursor and a (methyl)methacryloxy group-containing silane coupling agent, wherein the colorant precursor is produced by a reaction of a metal oxide and a siloxane compound under alkaline solution; and
    at least one hydrophilic monomer.

2. The polymerizable composition for coloring contact lenses according to claim 1, wherein the (methyl)methacryloxy group-containing silane coupling agent is selected from the group consisting of 3-(meth)acryloxypropyltrimethoxysilane, 3-(meth)acryloxypropyltriethoxysilane, 3-(meth)acryloxypropylmethyldiethoxysilane and 3-(meth)acryloxypropylmethyl-dimethoxysilane and a combination thereof.

3. The polymerizable composition for coloring contact lenses according to claim 1, wherein the siloxane compound is tetraethoxy silane or tetramethoxy silane.

4. The polymerizable composition for coloring contact lenses according to claim 1, wherein the hydrophilic monomer is selected from the group consisting of N-vinylpyrrolidone (NVP), 2-hydroxyethyl methacrylate (HEMA), N,N-dimethylacrylamide (DMA), methyl acrylic acid, acrylic acid, glycidyl methacrylate (GMA), (methyl)acrylamide, 2-(N,N-dimethylamino) ethyl methacrylate (DMAEMA), vinyl acetate, 2-(dimethylamino)ethyl methacrylate, N-acrylolmorpholine and a combination thereof.

5. The polymerizable composition for coloring contact lenses according to claim 1, further comprising a thickener which is selected from the group consisting of polyurethane, acrylic resin, phenolic resin, polyvinylpyrrodine and a combination thereof.

6. The polymerizable composition for coloring contact lenses according to claim 1, further comprising a cross-linking agent.

7. The polymerizable composition for coloring contact lenses according to claim 1, further comprising a dispersant.

8. The polymerizable composition for coloring contact lenses according to claim 1, further comprising a photo initiator or a thermal initiator.

9. The polymerizable composition for coloring contact lenses according to claim 1, wherein the composite colorant is in an amount of 10 weight percent to 60 weight percent based on the total amount of the polymerizable composition.

10. The polymerizable composition for coloring contact lenses according to claim 1, wherein the contact lenses are made from silicone gel or hydrogel.

* * * * *